United States Patent Office 3,585,185
Patented June 15, 1971

3,585,185
ESTER-CONTAINING POLYOLS
William W. Levis, Jr., Wyandotte, and Louis C. Pizzini, Trenton, Mich., assignors to Wyandotte Chemicals Corporation, Wyandotte, Mich.
No Drawing. Filed May 13, 1968, Ser. No. 728,814
Int. Cl. C07c 47/18
U.S. Cl. 260—210                              5 Claims

ABSTRACT OF THE DISCLOSURE

Ester-containing polyols are prepared by the reaction of alkylene oxide condensates of organic compounds having at least two active hydrogen atoms with halogen-containing organic acid anhydrides and alkylene oxides. The polyols are particularly useful in the preparation of flame-retardant polyurethane foams.

---

The present invention relates to ester-containing polyols and to the use thereof in the preparation of urethane compositions. More particularly, the invention relates to ester-containing polyols having halogen atoms chemically bound therein and to the use thereof in the preparation of flame-retardant polyurethane foams.

It has become increasingly important to impart flame-resistant properties to polyurethane plastics. This is particularly true where cellular polyurethanes are used, for example, as insulation, and to prevent the risk of fire in the daily use of other items. Numerous methods are known for imparting flame-resistant properties to polyurethane plastics. For example, in the production of the cellular polyurethanes one may use halogenated compounds or derivatives of acids of phosphorus as the active hydrogen-containing component and thus impart flame resistance. It is also possible to use compounds of antimony or boron. Moreover, non-reactive phosphorus or halogen-containing compounds may be used as additives for this purpose. All of these substances are capable of imparting some flame-resistant properties to polyurethane foam plastics. However, a disadvantage associated with these substances is that the use of increasing quantities leads to a serious impairment of the mechanical and physical properties of the cellular polyurethanes. Moreover, as the quantity of the flame-resisting agents is increased, the problem of mixing the component containing the flame-resisting agent with the balance of the components leading to the production of a cellular polyurethane plastic is increased.

It is an object of the present invention to provide novel ester-containing polyols which impart flame-resistant properties to polyurethane compositions and which are substantially devoid of the foregoing disadvantages. It is a further object of the present invention to provide polyurethane compositions useful in the preparation of foams, adhesives, binders, laminates, and coatings. These and other objects of the present invention will be apparent from the specification and examples which follow.

The above objects are accomplished in accordance with the present invention by providing novel ester-containing polyols having halogen atoms chemically bound therein and which are of relatively low viscosity. The novel ester-containing polyols of the present invention are prepared by the reaction of alkylene oxide condensates of organic compounds having at least two active hydrogen atoms with a halogen-containing organic acid anhydride and an alkylene oxide.

As mentioned above, there are three essential reactants employed in the preparation of the ester-containing polyols of the present invention, namely, an alkylene oxide condensate of organic compounds having at least two active hydrogen atoms, a halogen-containing organic acid anhydride, and an alkylene oxide. Alkylene oxides which may be employed in the preparation of the ester-containing polyols of the present invention include ethylene oxide, propylene oxide, the isomeric normal butylene oxides, hexylene oxide, octylene oxide, dodecene oxide, methoxy and other alkoxy propylene oxides, styrene oxide, and cyclohexene oxide. Halogenated alkylene oxides may also be used, such as epichlorohydrin, epiiodohydrin, epibromohydrin, 3,3-dichloropropylene oxide, 3-chloro-1,2-epoxypropane, 3 - chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed.

Alkylene oxide condensates of organic compounds having at least two active hydrogen atoms which may be employed in the preparation of the ester-containing polyols of the present invention are well known in the art as evidenced by U.S. Pats. Nos. 1,922,459, 3,190,927, and 3,346,557. They are generally prepared by the catalytic condensation of an alkylene oxide or mixture of alkylene oxides either simultaneously or sequentially with an organic compound having at least two active hydrogen atoms. Any of the alkylene oxides mentioned above may be employed. Representative organic compounds include polyhydric alcohols such as ethylene glycol, propylene glycol, the isomeric n-butylene glycols, 1,5-pentane diol, 1,6-hexane diol, glycerol, trimethololpropane, 1,2,6-hexane triol, sorbitol, sucrose, $\alpha$-methyl glucoside, and pentaerythritol; organic acids such as adipic acid, succinic acid, aconitic acid, and trimellitc acid; amines such as methyl amine, ethyl amine, ethylene diamine, diethylene triamine, toluene diamine, aniline, methylene dianiline, piperazine, and triisopropanol amine; phenolic compounds such as bisphenol, pyrogallol, resorcinol, inositol; mercaptans such as 1,2-ethanedithiol and 1,2,3-propanetrithiol; and acid amides such as acetamide and benzene sulfonamide. Mixtures of any of the above may also be employed. Generally, the condensates useful in the present invention will have a molecular weight between 100 and 10,000, preferably between 300 and 6,000.

The third reactant employed in the preparation of the ester-containing polyols is a halogen-containing organic acid anhydride. Typical anhydrides are halogenated polycarboxylic acid anhydrides such as dichloromaleic anhydride, tetrabromophthalic anhydride, tetrachlorophthalic anhydride, 1,4,5,6,7,7-hexachlorobicyclo(2.2.1)-5-heptene-2,3-dicarboxylic anhydride, hereinafter called chlorendic anhydride, 1,4,5,6,7,7-hexachloro-2-methylbicyclo(2.2.1)-5-heptene-2,3-dicarboxylic anhydride, 1,4,5, 6,7,7-hexachlorobicyclo(2.2.1) - 5 - heptene - 2 - acetic-2-carboxylic anhydride, 5,6,7,8,9,9-hexachloro-1,2,3,4,4a,5, 8,8a-octahydro-5,8-methano-2,3-naphthalene dicarboxylic anhydride, and 1,2,3,4,5,6,7,7 - octachloro-3,6-methano-1,2,3,6-tetrahydrophthalic anhydride. Mixtures of any of the above anhydrides may also be employed as well as mixtures of the above anhydrides and non-halogenated anhydrides such as phthalic anhydride, maleic anhydride, and trimellitic anhydride.

The ester-containing polyols of the present invention are generally prepared by heating the three reactants at temperatures between 50° C. and 150° C., preferably between 75° C. to 150° C., for 0.5 to 10 hours. Temperatures below 150° C. must be maintained to prevent the reaction of carboxy and hydroxy groups with the formation of water. The reaction is generally carried out under from 0 to 100 p.s.i.g. Alternatively, the alkylene oxide condensates and the halogen-containing organic acid anhydride may be added to a reaction vessel and heated to 50° C. to 150° C. for zero to ten hours. Thereafter, the alkylene oxide is added to the reaction mixture under pressure while maintaining the reaction temperature of between 75° C. and 150° C. After completion of the reaction, the reaction mixture may be filtered and is stripped of volatiles by heating for about one-half hour to three hours at 80° C. to 110° C. under less than 10 mm. of mercury. If desired, a solvent inert to the reaction may be employed in the preparation of the polyols of the present invention.

The amounts of reactants employed in the preparation of the ester-containing polyols of the present invention may vary. Generally, however, a mole ratio of alkylene oxide condensate to anhydride of from 1:0.1 to 1:12, preferably from 1:1 to 1:6, will be employed. The amount of alkylene oxide employed will be such to reduce the acid number of the alkylene oxide condensate-anhydride reaction mixture to five or less, preferably one or less. The hydroxyl number of the ester-containing polyol with vary considerably. Generally, however, the polyols will have a hydroxyl number of from about 20 to 600, preferably from about 35 to 400.

In a preferred embodiment of the present invention, the foregoing ester-containing polyols are employed in the preparation of polyurethan compositions, particularly polyurethane foams. The resulting polyurethane products exhibit marked improvements in flame-retardant properties without impairment of the other physical properties of the products. Moreover, the lower viscosity of these polyols enables them to be useful in the preparation of sprayable polyurethane compositions. The polyurethane products are generally prepared by the reaction of the ester-containing polyol with an organic polyisocyanate, optionally in the presence of additional polyhydroxyl-containing components, chain-extending agents, catalysts, surface-active agents, stabilizers, blowing agents, fillers, and pigments. Suitable processes for the preparation of cellular polyurethane plastics are disclosed in U.S. Reissue Patent 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenylmethane trisocyanate, polymethylene polyphenylisocyanate and tolylene 2,4,6-triisocyanate; and the tetraisocyanates such as 4,4'-dimethyldiphenylmethane 2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As mentioned above, the ester-containing polyol may be employed as the sole polyhydroxyl-containing component or it may be employed along with the polyhydroxyl-containing components commonly employed in the art. Representative of these components are hydroxyl-containing polyesters, polyalkylene polyether polyols, hydroxy-terminated polyurethane polymers, polyhydric polythioethers, polyhydroxyl-containing phosphorus compounds, polyacetals, aliphatic polyols, aliphatic thiols including alkane, alkene, and alkyne thiols having two or more —SH groups; diamines including both aromatic, aliphatic, and heterocyclic diamines, as well as mixtures thereof. Compounds which contain two or more different groups within the above-defined classes may also be used such as, for example, amino alcohols which contain an amino group and a hydroxyl group. Also compounds may be used which contain one —SH group and one —OH group as well as those which contain an amino group and a —SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-(4,4'-hydroxyphenyl)propane, commonly known as bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlohydrin as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)-propane and blends thereof having equivalent weights of from 250 to 5000.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohols such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in our copending U.S. patent application Ser. No. 728,840, filed May 13, 1968. Preferred polyhydroxyl-containing phosphorus compounds are prepared from alkylene oxides and acids of phosphorus having a $P_2O_5$ equivalency of from about 72% to about 95%.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Any suitable polyamine may be used including aromatic polyamines such as p-amino aniline, 1,5-diamino naphthalene, and 2,4-diamino toluene; aliphatic polyamines such as ethylene diamine, 1,3-propylene diamine, 1,4-butylene diamine, and 1,3-butylene diamine. Alkylene oxide adducts of any of the above polyamines may also be used, particularly propylene oxide adducts of p-amino aniline and ethylene diamine.

Other compounds which do not necessarily fit within any of the previously set forth classes of compounds which are quite suitable in the production of isocyanate-terminated prepolymers include the hydroxy-terminated polyurethane prepolymers such as a hydroxy-terminated prepolymer made by reacting an isocyanate with several moles of an alkylene glycol.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine 1,4-cyclohexane-bis-(methylamine), ethylene diamine, diethylene triamine, N-(2-hydroxypropyl)ethylene diamine, N,N'-di(2-hydroxypropyl)ethylene diamine, piperazine, 2-methylpiperazine, morpholine, and dodecahydro-1,4,7,9b-tetraazaphenalene.

Any suitable catalyst may be used including tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N,-diethyl-3-diethyl amino propyl amine, dimethyl benzyl amine, and the like. Other suitable catalysts are, for example, tin compounds such as stannous chloride, tin salts of carboxylic acids, such as dibutyltin di-2-ethyl hexoate, tin alcoholates such as stannous octoate, as well as other organo metallic compounds such as are disclosed in U.S. Pat. 2,846,408.

A wetting agent or surface-active agent is generally necessary for production of high grade polyurethane foam according to the present invention, since in the absence of same the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

Along with the ester-containing polyols of the present invention, non-reactive flame retardants may be employed in the preparation of th polyurethane compositions of the present invention. Representative flame retardants include tris-2-chloroethylphosphate, tris-2,3-dibromo-propylphosphate, antimony oxide, and polyammonium phosphate.

The following examples illustrate the nature of the invention. All parts are by weight unless otherwise stated.

EXAMPLE I

A reaction vessel equipped with a thermometer, stirrer, nitrogen source, and heat exchange means was charged with 3.5 parts of potassium hydroxide and 3000 parts of a 3000 molecular weight polyol prepared by condensing propylene oxide with glycerine (hydroxyl number of 54.9). The reaction vessel was purged with nitrogen, vented to 0 p.s.i.g., heated to 105° C., evacuated to less than 10 mm. of mercury, and maintained under these conditions for one-half hour. Then the reaction vessel was cooled to 75° C., the vacuum was relieved with nitrogen, and 1400 parts of tetrabromophthalic anhydride was charged. The reaction vessel was then purged with nitrogen, vented to 34 p.s.i.g., sealed, and then heated to 105° C. Over a two-hour period, 264 parts of ethylene oxide was then added to the reaction mixture maintaining the temperature of the mixture at 105° C. The pressure at the end of the addition was between 30–35 p.s.i.g. After completion of the oxide addition, the reaction mixture was stirred for three hours at 105° C. The reaction mixture was then treated in the usual manner to neutralize the basic catalyst, filtered through a celite bed, and stripped of volatiles by heating for one hour at 105° C. under a pressure of less than 10 mm. of mercury. The product had the following properties: hydroxyl number—37; acid number—0.03; and 21% bromine. A polyurethane foam prepared from this product exhibits improved flame-retardant properties.

EXAMPLE II

A reaction vessel equipped as described in Example I was charged with 1,112 parts of tetrabromophthalic anhydride, 24 parts of triethylamine, and 2400 parts of a 3000 molecular weight polyol prepared by condensing propylene oxide with glycerine (hydroxyl number of 54.9). The reaction vessel was then purged with nitrogen, vented to zero p.s.i.g., sealed, and heated to 125° C. Over a three-hour period, 232 parts of propylene oxide was added to the reaction mixture maintaining the temperature of the mixture at 125° C. The pressure at the end of the addition was between 20–25 p.s.i.g. After completion of the oxide addition, the reaction mixture was stirred for one hour at 125° C. The reaction mixture was stripped of volatiles by heating for one hour at 125° C. under a pressure of less than 5 mm. of mercury. The product had the following properties: hydroxyl number—34.4; acid number—<0.1; and 19.5% bromine.

A polyurethane foam was prepared employing 30 parts of the polyol prepared above along with 70 parts of a polyol prepared by the condensation of propylene oxide with glycerol (3000 molecular weight), 110 parts of toluene diisocyanate, 80/20 mixture of 2,4-2,6-isomers, three parts of water, one part of silicone surfactant, and one part of dibutyltin dilaurate. A flexible foam having flame-retardant properties was obtained. Another foam was prepared as above with the exception that the ester-containing polyol was replaced with 30 additional parts of the polyol described above. Flame tests (ASTM–D–1692–67T) were carried out on the two foams with the result that the foam prepared employing the polyol of the present invention exhibited 100% improvement in resistance to burning.

EXAMPLE III

A reaction vessel equipped as described in Example I was charged with 943 parts of tetrachlorophthalic anhydride, 16.5 parts of tri-n-butylamine, and 1650 parts of a 3000 molecular weight polyol prepared by condensing propylene oxide with glycerine (hydroxyl number of 54.9). The reaction vessel was then purged with nitrogen, vented to zero p.s.i.g., and sealed. The reaction mixture was then heated to 125° C. and maintained at this temperature for 0.5 hour. Over a three-hour period, 212 parts of propylene oxide was added to the reaction mixture maintaining the temperature of the mixture at 125° C. The pressure at the end of the addition was between 20–25 p.s.i.g. After completion of the oxide addition, the reaction mixture was heated to 150° C. and stirred at this temperature for one hour. The reaction mixture was then stripped of volatiles by heating for two hours at 125° C. under a pressure of less than 10 mm. of mercury. The product had the following properties: hydroxyl number—32.1; acid number—0.1; and 16.8% chlorine. A polyurethane foam which exhibited improved flame-retardant properties was prepared from this product.

EXAMPLE IV

A reaction vessel equipped as described in Example I was charged with 858 parts of tetrachlorophthalic anhydride, 15 parts of tri-n-butylamine, and 652 parts of a 1304 molecular weight polyol prepared by condensing propylene oxide with glycerine (hydroxyl number of 129). The reaction vessel was then purged with nitrogen, vented to zero p.s.i.g., and sealed. The reaction mixture was then heated to 125° C. and maintained at this temperature for 0.5 hour. Over a three-hour period, 209 parts of propylene oxide was added to the reaction mixture maintaining the temperature of the mixture at 125° C. The pressure at the end of the addition was between 20–25 p.s.i.g. After completion of the oxide addition, the reaction mixture was stripped of volatiles by heating for one hour at 125° C. under a pressure of less than 10 mm. of mercury. The product had the following properties: hydroxyl number—48.9; acid number—0.1; and 23% chlorine. A polyurethane foam which exhibited improved flame-retardant properties was prepared from this product.

EXAMPLE V

A reaction vessel equipped as described in Example I was charged with 185.5 parts of chlorendic anhydride, 4.3 parts of tri-n-butylamine, and 431.5 parts of a condensation product of propylene oxide and sucrose (hydroxyl number of 520). The reaction vessel was then purged with nitrogen, vented to zero p.s.i.g., and sealed. The reaction mixture was then heated to 150° C. and maintained at this temperature for 0.5 hour. Over a two-hour period, 58 parts of propylene oxide was then added to the reaction mixture maintaining the temperature of the mixture at 150° C. The pressure at the end of the addition was between 25–30 p.s.i.g. After completion of the oxide addition, the reaction mixture was stirred for two hours at 150° C. The reaction mixture was then stripped of volatiles by heating for one hour at 130° C. under a pressure of less than 2 mm. of mercury. The product had the following properties: hydroxyl number—372; acid number—0.35; and 15.6% chlorine.

EXAMPLE VI

A reaction vessel equipped as described in Example I was charged with 1113 parts of chlorendic anhydride and 1212 parts of a condensation product of propylene oxide and pentaerythritol (hydroxyl number of 556). The reaction vessel was then purged with nitrogen, vented to zero p.s.i.g., and sealed. The reaction mixture was then heated to 140° C. Over a three-hour period, 448 parts of propylene oxide was then added to the reaction mixture maintaining the temperature of the mixture at 140° C. The pressure at the end of the addition was between 30–35 p.s.i.g. After completion of the oxide addition, the reaction mixture was stirred for three hours at 125° C. The reaction mixture was stripped of volatiles by heating for one hour at 115° C. under a pressure of less than 5 mm. of mercury. The product had the following properties hydroxyl number—264; acid number—0.2; and 23.2% chlorine.

A polyurethane foam was prepared by the one-shot technique employing 20 parts of the ester-containing polyol prepared above, 15 parts of a polyalkylene ether polyol (hydroxyl number 440) prepared by capping with ethylene oxide a propylene oxide adduct of ethylene diamine (10% by weight of ethylene oxide), 10 parts of a 258 molecular weight phosphonate polyol prepared by the condensation of diethylphosphite with formaldehyde and diethanolamine, 40 parts of N,N,N,N-tetrakis(hydroxypropyl)ethylene diamine, 15 parts of a polyalkylene ether polyol having a hydroxy number of 540 and prepared by the condensation of propylene oxide with sucrose, 0.5 part of tetramethylene ethylene diamine, 1.0 part of a silicone surfactant, 0.5 part of stannous octoate, 60 parts of trifluorochloromethane, and 162 parts of polymethylene polyphenylisocyanate. The resulting foam was self-extinguishing. Physical properties of the foam are as follows: density, lbs./ft.$^3$—1.73; Flame Test D–1692–67T, inches burned—0.8; Butler Chimney Test, percent weight retention—40.7.

EXAMPLE VII

A reaction vessel equipped as described in Example I was charged with 464 parts of tetrabromophthalic anhydride, one part of tri-nbutylamine, and 400 parts of a condensation product of propylene oxide and pentaerythritol (hydroxyl number of 556). The reaction vessel was then purged with nitrogen, vented to zero p.s.i.g., sealed, and heated to 100° C. Over a three-hour period, 145 parts of propylene oxide was then added to the reaction mixture maintaining the temperature of the mixture at 100° C. The pressure at the end of the addition was between 10–15 p.s.i.g. After completion of the oxide addition, the reaction mixture was stirred for three hours at 100° C. The reaction mixture was then stripped of volatiles by heating for one hour at 100° C. under a pressure of less than 5 mm. of mercury. The product had the following properties: hydroxyl number—238; acid number—0.3; and 32% bromine. A polyurethane foam prepared from this product exhibits improved flame-retardant properties. Moreover, the viscosity of the product was sufficiently low to enable it to be used along with other components in the preparation of sprayable polyurethane compositions.

EXAMPLE VIII

A reaction vessel equipped as described in Example I was charged with 371 parts of chlorendic anhydride and 575 parts of a condensation product of propylene oxide and toluene diamine isomers (hydroxyl number of 390). The reaction vessel was then purged with nitrogen, vented to zero p.s.i.g., sealed, and heated to 140° C. Over a two and one-half hour period, 87 parts of propylene oxide was then added to the reaction mixture maintaining the temperature of the mixture at 140° C. The pressure at the end of the addition was between 30–35 p.s.i.g. After completion of the oxide addition, the reaction mixture was stirred for three hours at 140° C. The reaction mixture was stripped of volatiles by heating for one hour at 125° C. under a pressure of less than 1 mm. of mercury. The product had the following properties: hydroxyl number—217; acid number—0.4; and 19.8% chlorine.

What is claimed is:

1. A process for the preparation of an ester-containing polyol which comprises reacting at a temperature of from about 50° C. to 150° C. for about 0.5 hour to 10 hours
    (a) a condensate of a polyhydric alcohol selected from the group consisting of ethylene glycol, propylene glycol, the isomeric n-butylene glycols, 1,5-pentane diol, 1,6-hexane diol, glycerol, trimethylolpropane, 1,2,6-hexane triol, sorbitol, sucrose, α-methyl glucoside, and pentaerythritol and an alkylene oxide selected from the group consisting of ethylene oxide, propylene oxide and mixtures thereof,
    (b) a halogen-containing organic acid anhydride selected from the group consisting of tetrachlorophthalic anhydride, tetrabromophthalic anhydride, 1,4,5,6,7,7 - hexachlorobicyclo(2.2.1)-5-heptene-2,3-dicarboxylic anhydride and mixtures thereof, and
    (c) an oxide selected from the group consisting of ethylene oxide, propylene oxide, butylene oxide, epichlorohydrin and mixtures thereof,
the mole ratio of (a) to (b) being from 1:1 to 1:6 and the amount of oxide employed being such to reduce the acid number of the condensate-anhydride reaction product to one or less.

2. The process of claim 1 wherein the condensate is a propylene oxide condensate.

3. The process of claim 1 wherein the halogen-containing organic acid anhydride is tetrabromophthalic anhydride.

4. The process of claim 1 wherein the oxide is propylene oxide.

5. An ester-containing polyol prepared by the reaction at a temperature of from 50° C. to 150° C. for about 0.5 hour to 10 hours of
    (a) a condensate of polyhydric alcohol selected from the group consisting of ethylene glycol, propylene glycol, the isomeric n-butylene glycols, 1,5-pentane diol, 1,6-hexane diol, glycerol, trimethylolpropane, 1,2,6-hexane triol, sorbitol, sucrose, α-methyl glucoside, and pentaerythritol and an alkylene oxide selected from the group consisting of ethylene oxide, propylene oxide and mixtures thereof,
    (b) a halogen-containing organic acid anhydride selected from the group consisting of tetrachlorophthalic anhydride, tetrabromophthalic anhydride, 1,4,5,6,7,7 - hexachlorobicyclo(2.2.1)-5-heptene-2,3-dicarboxylic anhydride and mixtures thereof, and
    (c) an oxide selected from the group consisting of ethylene oxide, propylene oxide, butylene oxide, epichlorohydrin and mixtures thereof,
the mole ratio of (a) to (b) being from 1:1 to 1:6 and the amount of oxide employed being such to reduce the acid number of the condensate-anhydride reaction product to one or less.

References Cited

UNITED STATES PATENTS

| | | | |
|---|---|---|---|
| 3,089,863 | 5/1963 | Hicks et al. | 260—234 |
| 3,098,065 | 7/1963 | Crecelius et al. | 260—234 |
| 3,459,722 | 8/1969 | Byrd, Jr. et al. | 260—234 |

LEWIS GOTTS, Primary Examiner

J. R. BROWN, Assistant Examiner

U.S. Cl. X.R.

260—2.5, 234, 468, 475, 485